(12) United States Patent
Kotian et al.

(10) Patent No.: US 12,561,404 B1
(45) Date of Patent: Feb. 24, 2026

(54) SYSTEM FOR TARGET-AWARE MACHINE LEARNING

(71) Applicant: AMAZON TECHNOLGIES, INC., Seattle, WA (US)

(72) Inventors: Kunal Kotian, Seattle, WA (US); Indranil Bhattacharya, Seattle, WA (US); Sri Kaushik Pavani, Redmond, WA (US); Shikhar Gupta, Seattle, WA (US); Naval Bhandari, Redmond, WA (US); Sunny Dasgupta, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 962 days.

(21) Appl. No.: 17/662,508

(22) Filed: May 9, 2022

(51) Int. Cl.
| | |
|---|---|
| *G06F 18/2431* | (2023.01) |
| *G06F 18/2413* | (2023.01) |
| *G06F 18/2415* | (2023.01) |
| *G06N 20/00* | (2019.01) |

(52) U.S. Cl.
CPC ...... *G06F 18/2431* (2023.01); *G06F 18/2413* (2023.01); *G06F 18/2415* (2023.01); *G06N 20/00* (2019.01)

(58) Field of Classification Search
CPC ............. G06F 18/2431; G06F 18/2413; G06F 18/2415
See application file for complete search history.

(56) References Cited

U.S. PATENT DOCUMENTS

| | | | | |
|---|---|---|---|---|
| 10,402,691 | B1* | 9/2019 | Abdi Taghi Abad | ....................... G06F 18/2431 |
| 11,074,456 | B2* | 7/2021 | Farre Guiu | ............ G06V 20/41 |
| 2016/0078359 | A1* | 3/2016 | Csurka | ................. G06V 10/776 706/12 |
| 2021/0342650 | A1* | 11/2021 | Beluch | ................... G06N 3/082 |
| 2022/0044116 | A1* | 2/2022 | Arani | ................... G06V 10/776 |
| 2022/0084310 | A1* | 3/2022 | Thyagharajan | ...... G06V 10/774 |

OTHER PUBLICATIONS

"Fasttext Classifier Parameters in Python", 9 pgs. Retrieved from the Internet: URL: https://fasttext.cc/docs/en/python-module.html#train_supervised-parameters.

(Continued)

*Primary Examiner* — Barbara M Level
(74) *Attorney, Agent, or Firm* — Lindauer Law, PLLC

(57) ABSTRACT

A multi-class classifier (MCC) is trained using annotated data. The annotated data comprises instances of sample data and associated label data. Creation of the annotated data and subsequent active learning by the MCC uses resources. A target-aware active learning system selects sample data for addition to an annotation queue based on factors such as current accuracy of a particular class determination and priority of that class. As each instance in the sample data in the annotation queue is annotated and used for subsequent training, accuracy of particular classes is improved until a specified accuracy for that class is attained. By being selective in the ordering of instances in the annotation queue, overall resource usage and corresponding costs associated with creating annotated data and training is reduced. Overall accuracy for all classes is improved using a smaller overall set of annotated data compared to naïve approaches.

20 Claims, 4 Drawing Sheets

(56) References Cited

OTHER PUBLICATIONS

"Sagemaker K-Means Algorithm", 2 pgs. Retrieved from the Internet: URL: https://docs.aws.amazon.com/sagemaker/latest/dg/k-means.html.

Ash, et al., "Deep Batch Active Learning by Diverse, Uncertain Gradient Lower Bounds", CoRR, abs/1911.09162, Feb. 24, 2020, 26 pgs. Retrieved from the Internet: URL: https://arxiv.org/abs/1906.03671.

Beluch, et al., "The power of ensembles for active learning in image classification", In CVPR, pp. 9368-9377. IEEE Computer Society, 2018, 10 pgs. Retrieved from the Internet: URL: https://openaccess.thecvf.com/content_cvpr_2018/papers/Beluch_The_Power_of_CVPR_2018_paper.pdf.

Bilgic, et al., "Link-based Active Learning", In NIPS Workshop on Analyzing Networks and Learning with Graphs, 2009, 7 pgs. Retrieved from the Internet: URL: http://www.cs.iit.edu/~ml/pdfs/bilgic-nips09-wkshp.pdf.

Bloodgood, et al., "A Method for Stopping Active Learning Based on Stabilizing Predictions and the Need for User-Adjustable Stopping", Johns Hopkins University, Sep. 17, 2014, 9 pgs. Retrieved from the Internet: URL: https://arxiv.org/pdf/1409.5165.pdf.

Bloodgood, et al., "Taking into Account the Differences between Actively and Passively Acquired Data: The Case of Active Learning with Support Vector Machines for Imbalanced Datasets", The Association for Computational Linguistics, 2009, 4 pgs. Retrieved from the Internet: URL: https://arxiv.org/pdf/1409.4835.pdf.

Budd, et al., "A Survey on Active Learning and Human-in-the-Loop Deep Learning for Medical Image Analysis", Imperial College London, King's College London, May 5, 2021, 21 pgs. Retrieved from the Internet: URL: https://arxiv.org/pdf/1910.02923.pdf.

Citovsky, et al., "Batch Active Learning at Scale", Google Research, Jul. 29, 2021, 16 pgs. Retrieved from the Internet: URL: https://arxiv.org/pdf/2107.14263.pdf.

Cohn, et al., "Active Learning with Statistical Models", Massachusetts Institute of Technology, Department of Brain and Cognitive Sciences, 1996, 8 pgs. Retrieved from the Internet: URL: https://proceedings.neurips.cc/paper/1994/file/71975a56c761db6506eca0b37ce6ec87-Paper.pdf.

Dasgupta, et al., "Hierarchical Sampling for Active Learning", University of California, Department of Computer Science and Engineering, 2008, 8 pgs. Retrieved from the Internet: URL: https://www.cs.columbia.edu/~djhsu/papers/hier.pdf.

Devlin, et al., "BERT: Pre-training of Deep Bidirectional Transformers for Language Understanding", Google AI Language, May 24, 2019, 16 pgs. Retrieved from the Internet: URL: https://arxiv.org/pdf/1810.04805.pdf.

Freytag, et al., "Selecting Influential Examples: Active Learning with Expected Model Output Changes", Friedrich Schiller University, Computer Vision Group, 2014, 16 pgs. Retrieved from the Internet: URL: https://pub.inf-cv.uni-jena.de/pdf/Freytag14_SIE.

Gal, et al., "Deep Bayesian Active Learning with Image Data", In International Conference on Machine Learning, pp. 1183-1192, Mar. 8, 2017, 10 pgs. Retrieved from the Internet: URL: https://arxiv.org/pdf/1703.02910.pdf.

Guo, Yuhong., "Active Instance Sampling via Matrix Partition", Temple University, Department of Computer & Information Sciences, 2010, 9 pgs. Retrieved from the Internet: URL: https://people.scs.carleton.ca/~yuhongguo/research/papers/activenips10.pdf.

Holub, et al., "Entropy-Based Active Learning for Object Recognition", 2008 IEEE Computer Society Conference on Computer Vision and Pattern Recognition Workshops, pp. 1-8, 2008, 8 pgs. Retrieved from the Internet: URL: https://authors.library.caltech.edu/18852/1/Holub2008p84382008_Ieee_Computer_Society_Conference_On_Computer_Vision_And_Pattern_Recognition_Workshops_Vols_1-3.pdf.

Huang, et al., Active Learning by Querying Informative and Representative Examples, IEEE Trans Pattern Anal Mach Intell, Oct. 2014, 9 pgs. Retrieved from the Internet: URL: https://proceedings.neurips.cc/paper/2010/file/5487315b1286f907165907aa8fc96619-Paper.pdf.

Joulin, et al., "Bag of Tricks for Efficient Text Classification", Facebook AI Research, Aug. 9, 2016, 5 pgs. Retrieved from the Internet: URL: https://arxiv.org/pdf/1607.01759.pdf.

Kaelbling, Leslie Pack., "Exploitation versus Exploration: The Single-State Case", May 1, 1996, 2 pgs. Retrieved from the Internet: URL: https://www.cs.cmu.edu/afs/cs/project/jair/pub/volume4/kaelbling96a-html/node6.html.

Lewis, et al., "A Sequential Algorithm for Training Text Classifiers", In SIGIR '94, pp. 3-12. Springer 1994, 12 pgs. Retrieved from the Internet: URL: https://link.springer.com/chapter/10.1007/978-1-4471-2099-5_1.

Lin, et al., "Active Learning for Visual Question Answering: An Empirical Study", Virginia Tech, Nov. 6, 2017, 23 pgs. Retrieved from the Internet: URL: https://arxiv.org/pdf/1711.01732.pdf.

Liu, et al., "Active Deep Learning for Classification of Hyperspectral Images", IEEE Journal of Selected Topics in Applied Earth Observations and Remote Sensing, 2016, 13 pgs. Retrieved from the Internet: URL: https://arxiv.org/ftp/arxiv/papers/1611/1611.10031.pdf.

Paperswithcode. datasets for image classification task, 14 pgs. Retrieved from the Internet: URL: https://paperswithcode.com/datasets?mod=images&task=image-classification.

Paperswithcode. datasets for text classification task, 7 pgs. Retrieved from the Internet: URL: https://paperswithcode.com/datasets?task=text-classification&mod=texts.

Pedregosa, et al., "Scikit-learn: Machine Learning in Python", Journal of Machine Learning Research (2011), Oct. 2011, 6 pgs. Retrieved from the Internet: URL: https://www.jmlr.org/papers/volume12/pedregosa11a/pedregosa11a.pdf.

Ren, et al., "A Survey of Deep Active Learning", CoRR, abs/2009.00236, Dec. 5, 2021, 40 pgs. Retrieved from the Internet: URL: https://arxiv.org/pdf/2009.00236.pdf.

Roy, et al., "Toward Optimal Active Learning through Monte Carlo Estimation of Error Reduction", Carnegie Mellon University, Robotics Institute, 2001, 8 pgs. Retrieved from the Internet: URL: https://groups.csail.mit.edu/rrg/papers/icml01.pdf.

Schroder, et al., "A Survey of Active Learning for Text Classification using Deep Neural Networks", Natural Language Processing Group, University of Leipzig, Aug. 17, 2020, 16 pgs. Retrieved from the Internet: URL: https://arxiv.org/pdf/2008.07267.pdf.

Sculley, David, "Web-Scale K-Means Clustering", Google, Inc., 2010, 2 pgs. Retrieved from the Internet: URL: https://www.eecs.tufts.edu/~dsculley/papers/fastkmeans.pdf.

Sener, et al., "Active Learning for Convolutional Neural Networks: A core-Set Approach", Intel Labs, Jun. 1, 2018, 13 pgs. Retrieved from the Internet: URL: https://arxiv.org/pdf/1708.00489.pdf.

Shui, et al., "Deep Active Learning: Unified and Principled Method for Query and Training", Feb. 26, 2020, 19 pgs. Retrieved from the Internet: URL: https://arxiv.org/pdf/1911.09162.pdf.

Siddhant, et al., "Deep Bayesian Active Learning for Natural Language Processing: Results of a Large-Scale Empirical Study", Carnegie Mellon University, Sep. 24, 2018, 6 pgs. Retrieved from the Internet: URL: https://arxiv.org/pdf/1808.05697.pdf.

Slivkins, Aleksandrs "Introduction to Multi-Armed Bandits", Microsoft Research NYC, Jan. 2022, 188 pgs. Retrieved from the Internet: URL: https://arxiv.org/pdf/1904.07272.pdf.

Tomanek, et al., "An Approach to Text Corpus Construction which Cuts Annotation Costs and Maintains Reusability of Annotated Data", Jena University Language & Information Engineering (JULIE) Lab, Jun. 2007, 9 pgs. Retrieved from the Internet: URL: https://aclanthology.org/D07-1051.pdf.

Vlachos, Andreas, "A Stopping Criterion for Active Learning", Computer Laboratory, University of Cambridge, Jul. 2008, 3 pgs. Retrieved from the Internet: URL: https://www.sciencedirect.com/science/article/abs/pii/S088523080700068X.

Wu, et al., "Multi-Label Active Learning Algorithms for Image Classification: Overview and Future Promise", ACM Comput. Surv., 53(2), Mar. 2020, 35 pgs. Retrieved from the Internet: URL: https://dl.acm.org/doi/abs/10.1145/3379504.

(56) References Cited

OTHER PUBLICATIONS

Yu, et al., "PECOS: Prediction for Enormous and Correlated Output Spaces", Amazon, Jan. 18, 2022, 28 pgs. Retrieved from the Internet: URL: https://arxiv.org/pdf/2010.05878.pdf.

Yuan, et al., "Cold-start Active Learning through Self-supervised Language Modeling", University of Maryland, Oct. 22, 2020, 14 pgs. Retrieved from the Internet: URL: https://arxiv.org/pdf/2010.09535.pdf.

Zhu, et al., "Confidence-Based Stopping Criteria for Active Learning for Data Annotation", Northeastern University, Apr. 2010, 24 pgs. Retrieved from the Internet: URL: https://www.cs.cmu.edu/~hovy/papers/10ACMjournal-activelearning-stopping.pdf.

* cited by examiner

SYSTEM FOR TARGET-AWARE MACHINE LEARNING

BACKGROUND

Multi-class classifiers are used to process a wide variety of data in many different applications.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
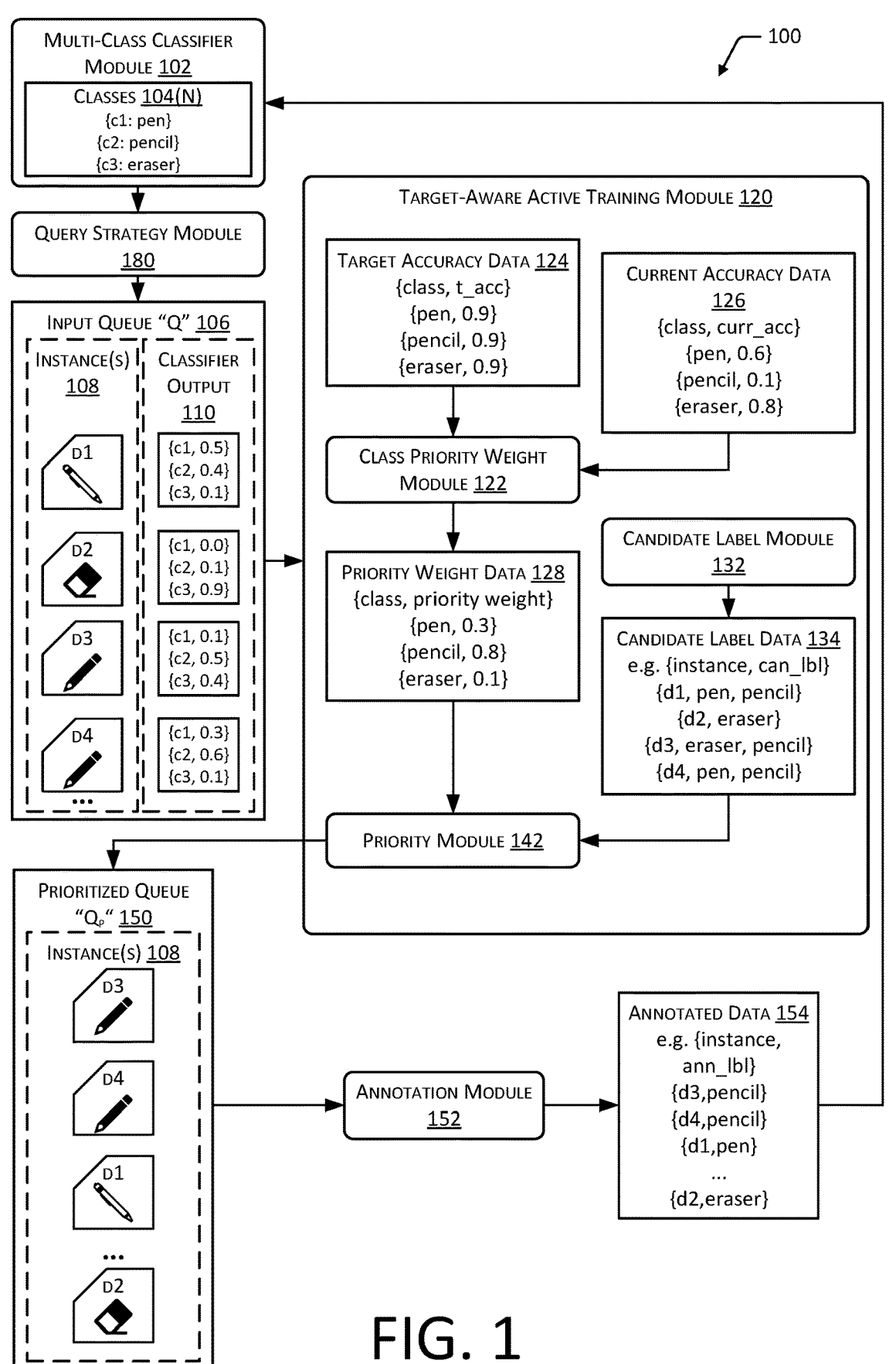
FIG. 1 illustrates a system for target-aware active learning for use by a multi-class classifier, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Machine learning systems such as multi-class classifiers (MCCs) are used in a wide variety of applications. During operation, an MCC processes input and provides as output information such as a class or set of classes, and may include a classifier score that indicates a likelihood that the determined class is correct. For example, an MCC may be trained to process input data such as images and determine if the image depicts one of three classes of objects: "pen", "pencil", or "eraser". If the MCC is provided with an input image, it may provide a classifier output that may include a list of all classes and associated classifier scores. Continuing the example, if the input image is of a pen, a properly trained and functioning MCC may provide as output "{pen, 0.9}, {pencil, 0.1}, {eraser, 0.0}" indicating that there is a high likelihood that the input image is of a pen, a low likelihood that the input image is a pencil, and no likelihood that the input image is of an eraser.

Various technical approaches may be used to implement an MCC. For example, MCCs may implement various kinds of neural networks, Bayesian classifiers, support vector machines, and so forth. Many MCCs are prepared for operation by performing one or more training operations. These training operations may include many iterations of processing annotated data with the MCC.

Annotated data may comprise many instances of sample data and associated labels. For example, each instance has an associated label. In some implementations, the annotated data may be created by a human operator. Continuing the earlier example, the annotated data may include a first image of a pen, and a label of "pen" assigned by a human operator. Typically, the larger the set of annotated data to use for training, the more accurate the MCC will be during operation. To attain desired levels of accuracy of an MCC, annotated data may include thousands or even millions of instances and labels. As a result, annotated data is expensive in time and cost to create.

During each iteration of training the MCC, an instance of annotated data is provided as input, and the resulting output is compared to the corresponding label in the annotated data. In some implementations, with each training iteration, modifications to internal values of the MCC are made to represent feedback between what the MCC determined the class to be and the class as indicated by the label of the instance. For example, the annotated data for an iteration is an image of a "pen" having an annotation label of "pen". Continuing the example, the output from that iteration may be a class of "eraser". The output of "eraser" is compared to the known annotation label of "pen" and is used to provide feedback to the MCC. By iterating many times, eventually the MCC may be trained to reach a level of accuracy that is deemed to be sufficient for use.

Once trained, the MCC may be used in a production setting to process query inputs and determine classifications associated with that query input. In some situations, learning may be ongoing. For example, additional training may be performed over time to further improve or maintain accuracy of the MCC.

Traditionally various approaches have been tried to select the samples used to train MCCs. These include random selection or various heuristics such as entropy analysis, expected loss reduction, and so forth. However, these systems have several drawbacks. In particular, they may continue to select samples for which the MCC is already sufficiently trained. This results in a substantial waste of resources. For example, using traditional approaches, samples are sent for costly annotation and the resulting annotated data is used to perform additional training iterations that do not provide a useful improvement in accuracy.

Described in this disclosure are systems and techniques for target-aware training of a machine learning system such as an MCC. The MCC processes a first set of instances of sample data and produces classifier output. These instances and their associated classifier output may then be processed using a query strategy, with the output stored for further processing, such as in an input queue.

A priority weight value for each class is determined based on a target accuracy for each class, and a current accuracy for each class. The priority weight value provides data indicative of which classes may benefit from additional training. For example, a class with a current accuracy that is far below its target accuracy may have a large priority weight value while a class with a current accuracy that is at or above its target accuracy may have a low priority weight value.

Instances in the input queue may be processed to determine associated sets of candidate labels. The set of candidate labels for an instance may be determined based on the classifier output for that instance. For example, only those classes in the classifier output that have a classifier score greater than a threshold value may be included in the set of candidate labels. This filters out low-confidence labels.

The priority weight data and the set of candidate labels are then used to determine a prioritized queue of instances for subsequent annotation and use in training. For example, the ordering of instances in the prioritized queue may be based on the set of candidate labels and the priority weight values. As a result, those instances that have candidate labels that are more highly weighted (those deemed to have insufficient accuracy) are prioritized first in the prioritized queue, compared to those instances that have candidate labels that have lower weights. In some implementations other limits may be applied to the prioritized queue. For example, the prioritized queue may be limited to a top k entries, where k is a positive integer.

The instances in the prioritized queue may then be processed, in the order specified, to determined annotated data. This annotated data may then be used to further train the MCC. The process may continue until the target accuracies for the classes have been achieved.

By using the techniques and systems described herein, a machine learning system such as an MCC is able to be quickly and efficiently trained. Compared to naïve methods of annotation data, substantial reductions are realized in the size of instances processed and corresponding reductions in the time and cost to determine the annotations. Consumption of compute resources during training are also reduced as the overall size of the annotated data used may be less than that associated with traditional techniques.

Illustrative System

FIG. 1 illustrates a system 100 for target-aware active learning for use by a multi-class classifier, according to some implementations. A multi-class classifier (MCC) module 102 is shown. The MCC module 102 may utilize one or more neural networks, Bayesian classifiers, support vector machines, and so forth.

The MCC module 102 is trained to provide, responsive to input (not shown), output indicative of one or more classes 104(1), 104(2), ..., 104(N) that are deemed to be associated with the input. For example, an MCC module 102 may be trained to determine if an object depicted in an image is a pen, pencil, or eraser. In this example, there are three classes 104: a first class 104(1) {pen}, a second class 104(2) {pencil}, and third class 104(3) {eraser}.

After processing the input, the MCC module 102 provides classifier output 110. For example, the classifier output 110 may indicate, for the input image, classifier scores indicative of a likelihood that the input image belongs to that class. Continuing the example, the classifier output 110 may indicate classifier scores of {0.5, 0.4, 0.1} indicating that there is a 50% chance that the input image belongs to the first class 104(1) {pen}, a 40% chance that the input image belongs to the second class 104(2) {pencil}, and a 10% chance that the input image belongs to the third class 104(3) {eraser}.

The accuracy of the output from the MCC module 102 is indicative of the ability of the MCC module 102 to distinguish between different classes 104. The accuracy may be specified in terms of one or more of percentage of correct classifications relative to all, recall, precision, classification accuracy, false positive rate, and so forth. For example, the accuracy of the MCC module 102 may be specified as 90% recall at 85% precision.

The MCC module 102 is trained using annotated data 154. The annotated data 154 comprises instances 108 of sample data and associated annotation labels. An initial set of annotated data 154 may be used to perform initial training. Once initial training is complete, further active training may be performed to improve the performance of the MCC module 102.

Creation of annotated data 154 is time consuming and expensive. For example, annotated data 154 may be created by presenting instances 108 of sample data to a user who then assigns an annotation label, such as "pen", "pencil", or "eraser" in the example above. In general, the larger the set of annotated data 154, the more training of the MCC module 102 may be performed. Additional training with annotated data 154 may also improve accuracy of the classification determinations made by the MCC module 102.

In a traditional system, various approaches have been attempted to select which instances 108 of sample data should be used to create annotated data 154. However, these approaches fail to provide a substantial improvement in performance, and may still result in unnecessary waste of resources to create unnecessary annotation data 154 and perform training using that unnecessary annotation data 154.

A target-aware active training module 120 accepts as input an input queue 106 and determines a prioritized queue 150 of instances 108 of sample data. The prioritized queue 150 may then be used to determine annotated data 154 for additional training as described below.

The input queue 106 "Q" comprises one or more instances 108 of sample data. In this illustration, four instances d1, d2, d3, and d4 are shown. Each instance 108 may be associated with classifier output 110. For example, the instance 108 may be provided as input to the MCC module 102 and processed to determine the classifier output 110. The instances 108 included in the input queue 106 may be determined by a query strategy module 180 that implements a query strategy associated with the MCC module 102. For example, the query strategy module 180 may implement a query strategy to select instances 108 for further training. Continuing the example, the query strategy may be a random selection of instances 108 from a corpus of sample data. In another example, the query strategy may comprise selecting for inclusion in the input queue 106 instances 108 of sample data from a corpus of sample data that have entropy values that are greater than a threshold value, with top k entropy values, and so forth. In some implementations the query strategy module 180 may be included in the MCC module 102.

The target-aware active training module 120 may comprise a class priority weight module 122, a candidate label module 132, and a priority module 142.

The class priority weight module 122 accepts as input target accuracy data 124 and current accuracy data 126, and determines as output priority weight data 128. The target accuracy data 124 is indicative of the classes 104(N) used by the MCC module 102 and the target or specified accuracy. For example, an operator may specify that the first class 104(1) has a target accuracy of 0.9, the second class 104(2) has a target accuracy of 0.9, and the third class 104(3) has a target accuracy of 0.9. Each class may have a different target accuracy, or the same target accuracy may be specified for all classes, such as in this illustration. The target accuracy data 124 may be determined based on factors such as the accuracy required by a subsequent system (not shown).

For example, if the subsequent system uses the classifier output 110 to operate an autonomous vehicle, a relatively high target accuracy may be specified. In comparison, if the subsequent system uses the classifier output 110 to recommend an item for purchase, a lower target accuracy may be deemed suitable.

The current accuracy data 126 may be indicative of the accuracy of the MCC module 102 after the most recent iteration of training. The accuracy may be specified as one or more of recall, precision, classification accuracy, false positive rate, or other metrics. In one implementation, accuracy may be calculated as: (TP+TN)/(FP+FN+TP+TN) where TP is a true positive classification, TN is a true negative classification, FP is a false positive classification, and FN is a false negative classification. Precision may be calculated as: TP/(FP+TP). Recall may be calculated as TP/(FN+TP).

The current accuracy data 126 may be determined using one or more techniques. In one implementation, the current accuracy data 126 may be determined by processing one or more test instances of annotated data 154 and comparing the classifier output 110 to the associated annotation labels. In another implementation the current accuracy data 126 may be determined based on the classifier output 110, metrics associated with operation of the MCC module 102, and so forth.

The class priority weight module 122 determines as output the priority weight data 128. The priority weight data 128 comprises data indicative of one or more of the classes 104 and a weight value. In the following examples, the lower the current accuracy of a given class 104 relative to its target accuracy, the greater the weight value indicated in the priority weight data 128. For example, classes 104 for which the MCC module 102 is underperforming (providing classifications with an accuracy less than that targeted) have a greater weight value compared to classes 104 for which the MCC module 102 is performing at or better than the target accuracy.

The class priority weight module 122 may implement one or more of the following equations.

Let $Y=\{y_1, y_2, \ldots, y_k\} \cup \{y_{k+1}\}$ be the set of classes 104. The k classes $\{y_1, y_2, \ldots, y_k\}$ may comprise the classes 104 of interest while class $\{y_{k+1}\}$ represents classes 104 that do not belong to any of the k classes. For a class $y_i$, let $\rho_i$ represent the target accuracy value such as specified in the target accuracy data 124, and let $\hat{\rho}_i$ represent the current accuracy value at iteration $\ell$, such as specified in the current accuracy data 126.

The class priority weight module 122 may generate a weight $w_i$ at learning iteration $\ell$ for class $y_i$ such that:

$$w_i \propto \max(\lambda(\rho_i - \hat{\rho}_i), 0) \qquad \text{EQUATION 1}$$

In one implementation, to increase $\hat{\rho}_i$ (e.g. recall), $\lambda=+1$, otherwise to decrease $\rho_i$ (e.g. false positive rate) $\lambda=-1$.

In one implementation in which a class-level recall metric is used, the class priority weight module 122 may determine the priority weight values $w_i$ of the priority weight data 128 for a class $y_i$ using Equation 2.

$$w_i = \begin{cases} \dfrac{\max\left(re_i - \hat{r\tilde{e}}_i, 0\right)}{\sum_{j=1}^{k} \max\left(re_i - \hat{r\tilde{e}}_i, 0\right)}, & \text{if } i = 1, 2, \ldots, k \\ 0, & \text{if } i = k + 1 \end{cases} \qquad \text{EQUATION 2}$$

With regard to Equation 2, let $re_i$ be the accuracy indicative of a target recall value at a specified precision (e.g. 90% recall at 85% precision) and $\hat{r\tilde{e}}_i$ is the estimated accuracy at learning iteration $\ell$. The weight of $w_{k+1}$ is 0 in implementations where an improvement in accuracy for only the k classes of interest is required.

In some implementations supplemental data may be used to determine the priority weight data 128. For example, the supplemental data may comprise a weight value for one or more classes 104 that is specified by an operator or another system. Continuing the example, the supplemental data may be determined based on results from previous training iterations. In another example, the supplemental data may specify a fixed value or a function that modifies Equation 2 to determine the weight value for a particular class 104.

The candidate label module 132 determines candidate label data 134. The candidate label module 132 may accept as input the input queue 106 or a portion thereof. The candidate label data 134 comprises information indicative of one or more of the instances 108 and a set of candidate labels that may be associated with each of the respective instances 108.

The candidate label module 132 may apply one or more thresholds or filters to determine the set of candidate labels for a given instance 108. In one implementation, if the classifier output 110 indicates that a classifier score for a particular class 104 is less than a threshold value, that low scoring particular class 104 may be omitted from the set of candidate labels. In another implementation, the set of candidate labels may comprise the top k entries, ranked by classifier score, where k is a positive integer.

The candidate label module 132 may implement Equation 3 to determine the candidate label data 134. With regard to Equation 3, let $Y_c$ be the subset of classes 104 with a high likelihood of containing the true class of an unlabeled instance x. $Y_c$ may be determined using available information with respect to x. For example, the candidate label module 132 may use the classifier output 110 across a plurality of classes 104 to determine the set of candidate classes indicated in the candidate label data 134. By retraining the MCC module 102 after labelling x, an improvement in the accuracy over all classes in $Y_c$ may be realized. Performance may be improved by minimizing the overall size of $Y_c$.

$$Y_c = \left\{ y \in Y \;\middle|\; \frac{P(y \mid x)}{\max_{y \in Y} P(y \mid x)} \geq t_c \right\} \qquad \text{EQUATION 3}$$

With regard to Equation 3, $P(y \mid x) \in [0,1]$ may comprise a probability value assigned to class y by the MCC module 102 given instance x. For example, the classifier output 110 may comprise the probability value. The specified threshold value $t_c$ may be empirically determined. For example, $t_c$ may be set to 0.5, indicating that classes 104 with classifier scores greater than or equal to 50% of a maximum score would be included in the candidate label data 134 within the set of candidate class labels for a particular instance x.

The priority module 142 accepts as input the priority weight data 128 and the candidate label data 134 and determines as output the prioritized queue 150 "$Q_p$". The ordering of the instances 108 in the prioritized queue 150 may be significant. In other implementations, an index value may be assigned to each instance 108, with the index value being indicative of the ordering determined by the priority module 142.

The priority module 142 may apply one or more thresholds or filters to determine which instances 108 to include in the prioritized queue 150. In one implementation, the priority module 142 may limit the prioritized queue 150 to a top k entries, where k is a positive integer. In some situations, the number of instances 108 in the input queue 106 may be greater than the number of instances 108 in the prioritized queue 150.

The priority module 142 may implement Algorithm 1 as indicated below.

Let Inputs:

Input queue 106 "Q" of instances generated by a query strategy of the MCC module 102.

Number of instances $N_q \leq |Q|$ desired in the output.

Class priority weights 128 "W" as $(w_1, w_2, \ldots, w_k)$ where $w_i$ is the priority weight for class $y_i$.

The description describes the use of queues by way of illustration and not necessarily as a limitation. Other data structures may be used.

For ease of illustration, and not as a limitation, this disclosure describes an MCC module 102 using three classes 104(1)-(3). It is understood that an MCC module 102 utilizing any number of classes 104 may use the system and techniques described herein.

Figure 2:
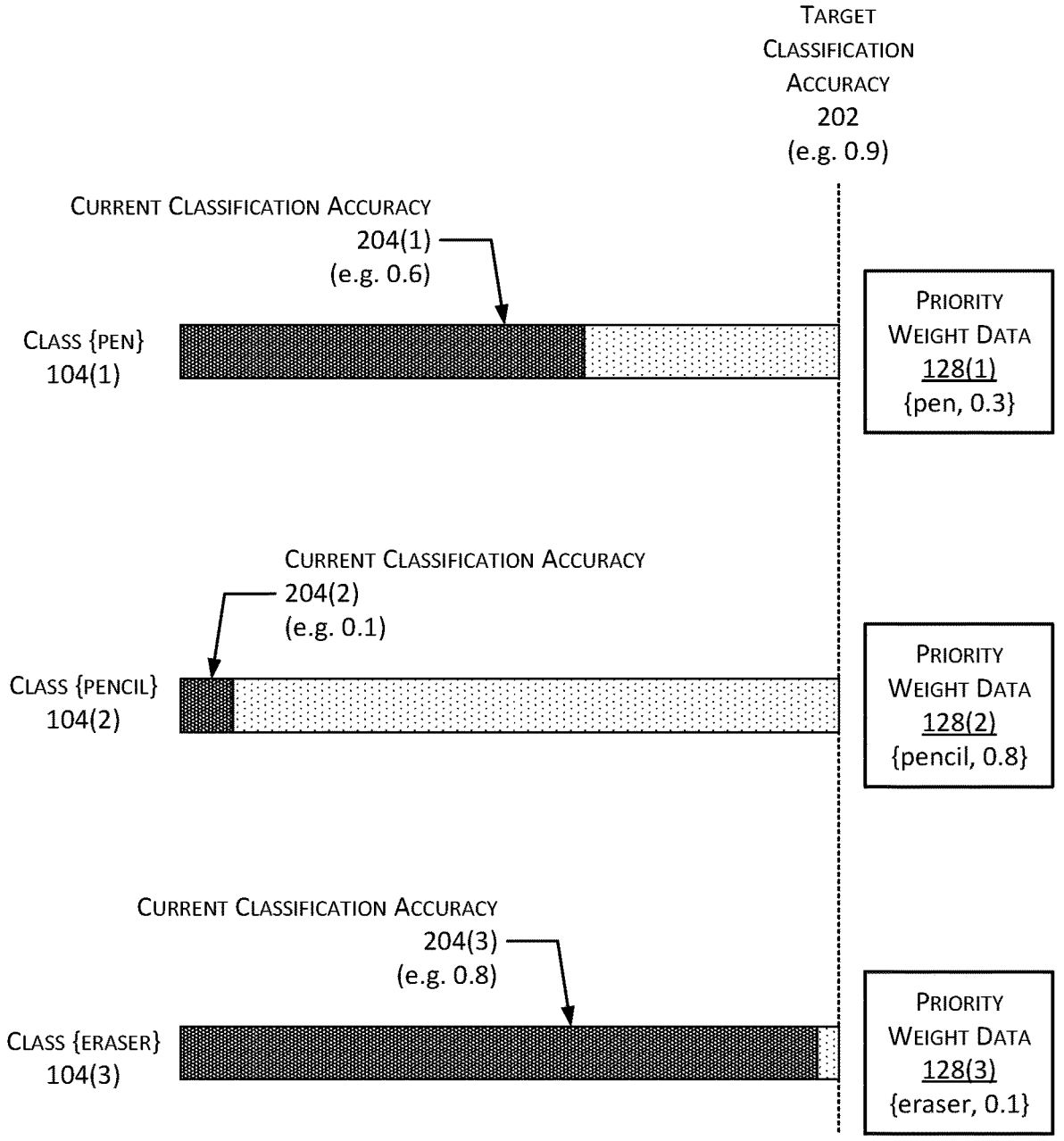
FIG. 2 illustrates a graph of classes and their associated current classification accuracies and target classification accuracies in one implementation.

FIG. 2 illustrates a graph 200 of classes 104(1)-(3) and their associated current classification accuracies and target classification accuracies, in one implementation. In this illustration, the MCC module 102 is trained to classify an input based on three classes 104(1) {pen}, 104(2) {pencil}, and 104(3) {eraser}. In this illustration these classes 104

---

ALGORITHM 1

Let Output: Prioritized Queue 150 "$Q_p$" of instances 108 "x"
1 Initialize an empty queue $Q_p$.
2 Initialize candidate labels map M mapping each instance x in Q to value M[x], with M[x]
      ← Ø, ∀x ∈ Q.
3 Initialize a set of classes eligible to be prioritized as Yp ← Y.
4 while $|Q_p|$ < $N_q$ do
5   Randomly sample 1 class $y_{selected}$ ∈ $Y_p$ per weights W.
6   i ← 1
7   while i ≤ |Q| do
8     d ← instance at index i in Q
9     /* lazy computation of d's set of candidate labels */
10    if M[d] = Ø then
11      M[d] ← $Y_c$, candidate set of labels for d (See Eq. (3)).
12    end
13 /* if $y_{selected}$ is d's candidate label, remove it from the set of candidate labels
before queuing it in $Q$p */
14     if $y_{selected}$ ∈ M[d] then
15      M[d] ← M[d] \ {$y_{selected}$}
16      if M[d] = Ø then
17       Remove d from Q. Exit while loop at Line 7.
18      end
19    else // move to the next instance in Q
20      i ← i + 1
21      /* if no instances have candidate label $y_{selected}$ */
22      if i > |Q| then
23       $Y_p$ ← $Y_p$ \{$y_{selected}$}
24      end
25    end
26  end
27  if d ∉ $Q_p$ then $Q_p$.enqueue(d);
28 end
29 return $Q_p$

---

The prioritized queue 150 may be provided to an annotation module 152. The annotation module 152 may comprise one or more machine learning systems, human annotators, and so forth. The annotation module 152 may process the prioritized queue 150, in the order specified by the queue, to determine the annotated data 154. The annotated data 154 may comprise the instances 108 of sample data specified by the prioritized queue 150 and label data appended by the annotation module 152 to each instance 108. The instances 108 and their annotation labels are then provided to the MCC module 102. The MCC module 102 may then be trained using the annotation data 154.

The process may continue to iterate. With each iteration, the MCC module 102 is assessed and further the prioritized queue 150 is determined, producing further annotated data 154 that in turn is used to train the MCC module 102. In one implementation, the process may cease when the current accuracy data 126 indicates that the current accuracy values for one or more classes 104 are greater than or equal to the target values specified in the target accuracy data 124. Continuing the example shown in FIG. 1, when all classes 104(1)-(3) have a current accuracy of 0.9 or greater, the process may cease.

(1)-(3) have the same target classification accuracy 202, such as specified in the target accuracy data 124. In other implementations, different classes 104 may have different target classification accuracy values.

The current accuracy data 126 indicates that the first class 104(1) {pen} has a current classification accuracy 204(1) of 0.6. This is less than the desired target classification accuracy 202 of 0.9 specified by the target accuracy data 124. The priority weight data 128(1) that is associated with the first class 104(1) has been determined by the class priority weight module 122 as 0.3.

The current accuracy data 126 indicates that the second class 104(2) {pencil} has a current classification accuracy 204(2) of 0.1. This is less than the desired target classification accuracy 202 of 0.9 specified by the target accuracy data 124. The priority weight data 128(2) that is associated with the second class 104(2) has been determined by the class priority weight module 122 as 0.8.

The current accuracy data 126 indicates that the third class 104(3) {eraser} has a current classification accuracy 204(3) of 0.8. This is less than the desired target classification accuracy 202 of 0.9 specified by the target accuracy data 124. The priority weight data 128(3) that is associated with the third class 104(3) has been determined by the class priority weight module 122 as 0.1.

As illustrated here, as the current classification accuracy 204 of a class 104 increases, the priority weight associated with that class 104 decreases. For example, the third class 104(3) {eraser} has a current classification accuracy 204(3) that is close to the target classification accuracy 202. In comparison, the second class 104(2) {pencil} has a current classification accuracy 204(2) that is far less than the target classification accuracy 202. As a result, the prioritized queue 150 associated with this graph will prioritize instances 108 that are likely to contain the second class 104(2) {pencil}, followed by the first class 104(1) {pen}, and eventually may include the third class 104(3) {eraser}. This prioritized ordering is illustrated in the depiction of the prioritized queue 150 of FIG. 1.

Figure 3:
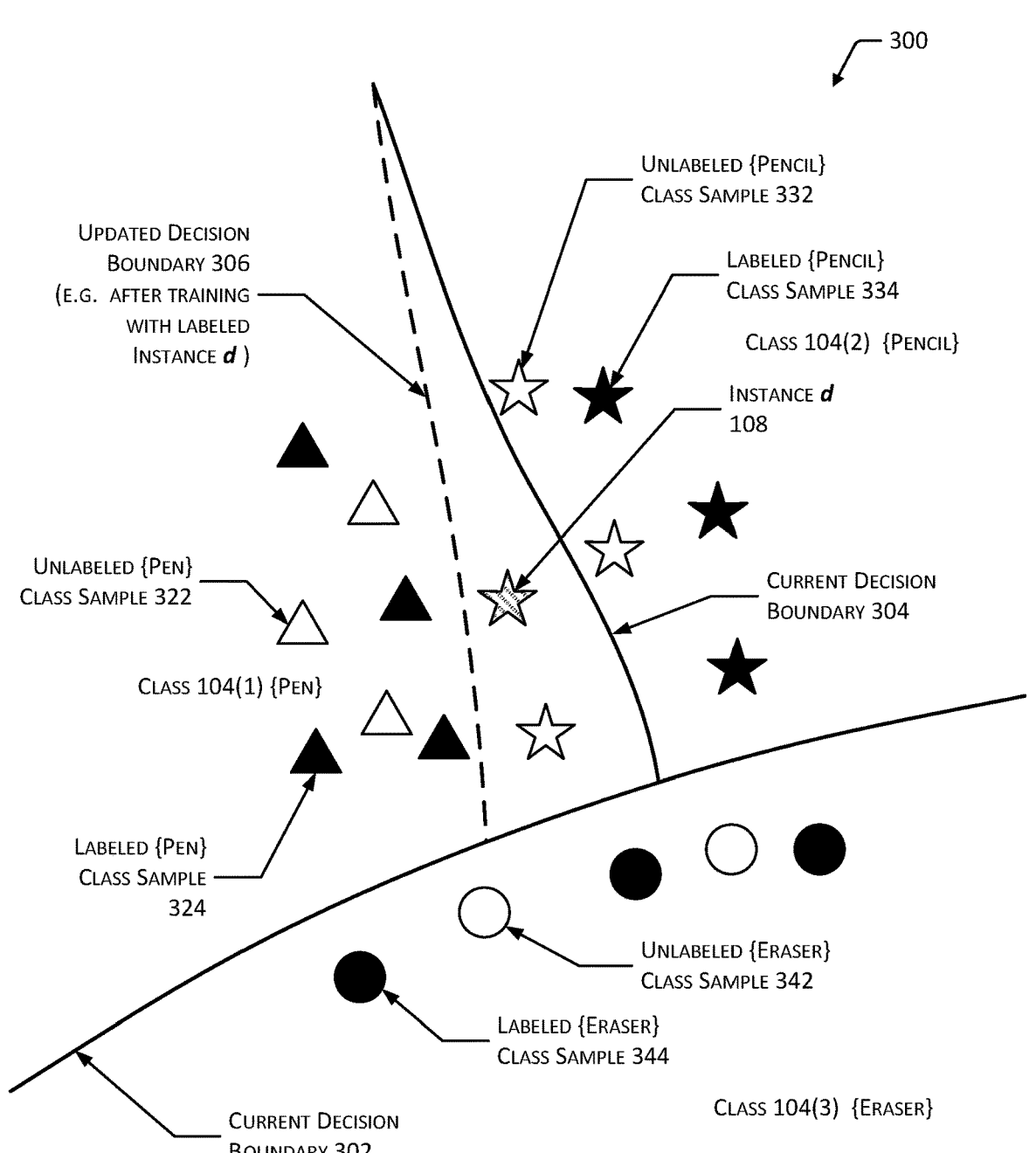
FIG. 3 illustrates decision boundaries between classes and subsequent improvement following target-aware active learning, according to some implementations.

FIG. 3 illustrates a graph 300 of decision boundaries between classes and subsequent improvement following target-aware active learning, according to some implementations. Following the example illustrated in FIG. 1, the MCC module 102 specifies three classes 104(1)-(3). This graph 300 may be considered a representation of a classification space. Samples associated with the first class 104(1) are illustrated as triangles. Samples associated with the second class 104(2) are illustrated as stars. Samples associated with the third class 104(3) are illustrated as circles. A sample that is illustrated as black is a labeled sample while a sample that is illustrated as white is an unlabeled sample.

A current decision boundary 302 is shown that differentiates a first boundary between the third class 104(3) {eraser} and the other two classes. A current decision boundary 304 is also shown that differentiates a second boundary between the first class 104(1) {pen} and the second class 104(2) {pencil}.

Within the space delineated by the current decision boundary 302 and the current decision boundary 304 that is associated with the first class 104(1) {pen}, are a number of unlabeled {pen} class samples 322 and labeled {pen} class samples 324. There is also incorrectly the instance d 108 and an unlabeled {pencil} class sample 332 within the space of the first class 104(1) {pen}. This may manifest as the MCC module 102 incorrectly classifying an input depicting a pencil as being a pen.

As a result of using the target-aware active training module 120, the prioritized queue 150 prioritizes for the next iteration of training instances 108 that include pencils. As a result, annotated data 154 that includes more instances 108 of pencils and their corresponding labels is provided to the MCC module 102 for further training. After this training using the annotated data 154, the boundary between the first class 104(1) and the second class 104(2) has changed to the updated decision boundary 306. As a result, during subsequent operation of the MCC module 102 the accuracy of the distinction between the first class 104(1) and the second class 104(2) is improved.

Figure 4:
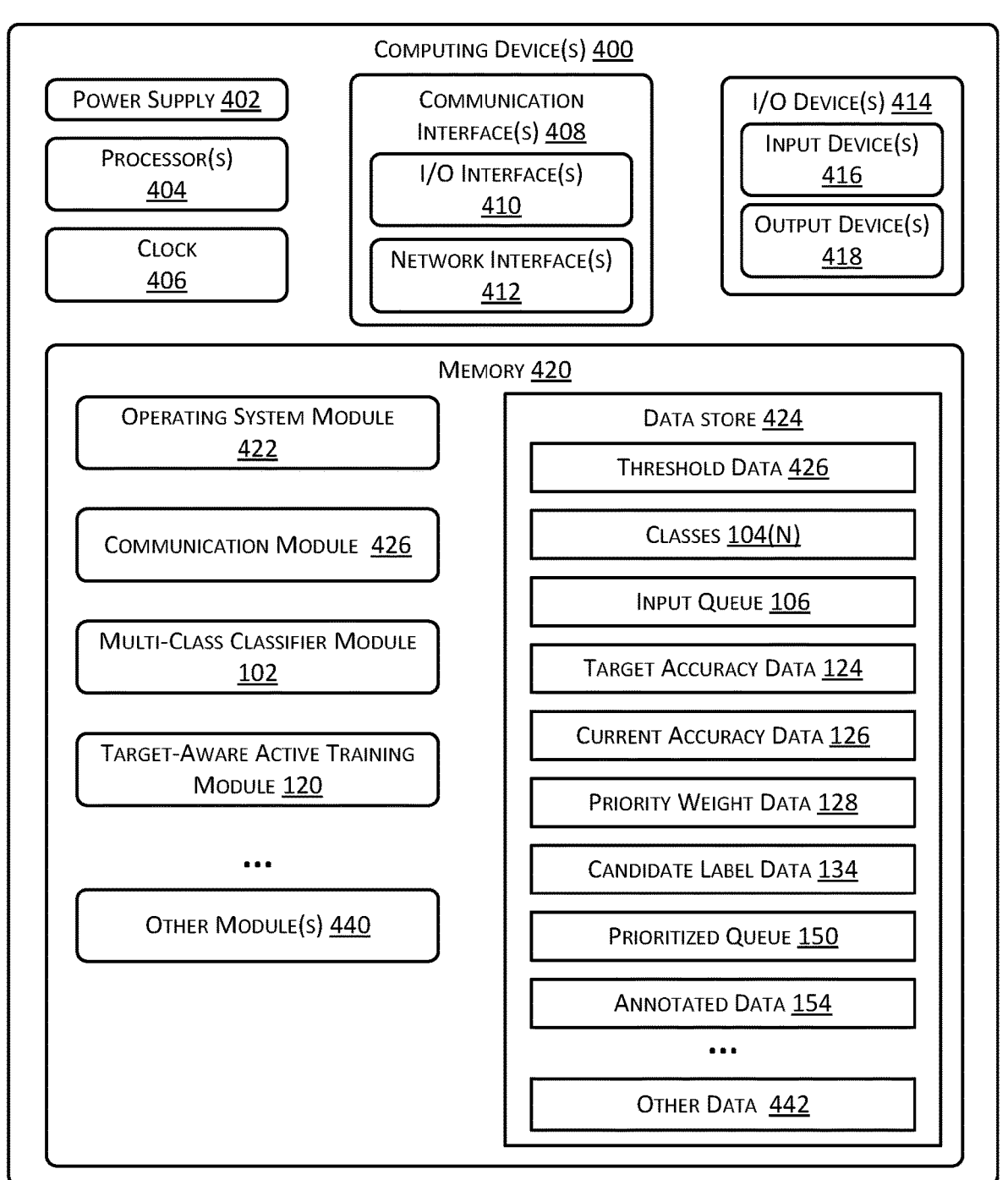
FIG. 4 is a block diagram of a computing device to implement the system, according to some implementations.

FIG. 4 is a block diagram of a computing device 400 to implement the system 100, according to some implementations. The computing device 400 may be implemented as one or more of an "embedded system", "on-demand computing", "software as a service (Saas)", "platform computing", "network-accessible platform", "cloud services", "data centers", and so forth. Services provided by the computing device 400 may be distributed across one or more physical or virtual devices.

One or more power supplies 402 may be configured to provide electrical power suitable for operating the components in the computing device 400. The one or more power supplies 402 may comprise batteries, connections to an electric utility, and so forth. The computing device 400 may include one or more hardware processors 404 (processors) configured to execute one or more stored instructions. For example, the hardware processors 404 may include application specific integrated circuits (ASICs), field-programmable gate arrays (FPGAs), digital signal processors (DSPs), hardware accelerators, graphics processing units (GPUs), and so forth. For example, the processors 404 may include hardware optimized to perform one or more functions of the MCC module 102, the target-aware active training module 120, and so forth. The processors 404 may comprise one or more cores. One or more clocks 406 may provide information indicative of date, time, ticks, and so forth.

The computing device 400 may include one or more communication interfaces 408 such as input/output (I/O) interfaces 410, network interfaces 412, and so forth. The communication interfaces 408 enable the computing device 400, or components thereof, to communicate with other devices or components. The communication interfaces 408 may include one or more I/O interfaces 410. The I/O interfaces 410 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), serial AT attachment (SATA), and so forth.

The I/O interface(s) 410 may couple to one or more I/O devices 414. The I/O devices 414 may include input devices 416 such as one or more of a sensor, keyboard, mouse, scanner, and so forth. The I/O devices 414 may also include output devices 418 such as one or more of a display device, printer, audio speakers, and so forth. In some embodiments, the I/O devices 414 may be physically incorporated with the computing device 400 or may be externally placed.

The network interfaces 412 may be configured to provide communications between the computing device 400 and other devices, such as routers, access points, and so forth. The network interfaces 412 may include devices configured to couple to personal area networks (PANs), local area networks (LANs), wireless local area networks (WLANS), wide area networks (WANs), and so forth. For example, the network interfaces 412 may include devices compatible with Ethernet, Wi-Fi, Bluetooth, and so forth.

The computing device 400 may also include one or more buses or other internal communications hardware or software that allow for the transfer of data between the various modules and components of the computing device 400.

As shown in FIG. 4, the computing device 400 includes one or more memories 420. The memory 420 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 420 provides storage of computer-readable instructions, data structures, program modules, and other data for the operation of the computing device 400. A few example functional modules are shown stored in the memory 420, although the same functionality may alternatively be implemented in hardware, firmware, or as a system on a chip (SoC).

The memory 420 may include at least one operating system (OS) module 422. The OS module 422 is configured to manage hardware resource devices such as the I/O interfaces 410, the I/O devices 414, the communication interfaces 408, and provide various services to applications or modules executing on the processors 404. The OS module 422 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 420 may be a data store 424 and one or more of the following modules. For example, these modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including other computing devices 400, network attached storage devices, and so forth.

The data store 424 may store one or more of threshold data 426, the classes 104, input queue 106, target accuracy data 124, current accuracy data 126, priority weight data 128, candidate label data 134, the prioritized queue 150, annotated data 154, and so forth.

A communication module 426 may be configured to establish communications with other computing devices 400 or other devices. The communications may be authenticated, encrypted, and so forth.

The memory 420 may also store the multi-class classifier module 102 and the target-aware active training module 120.

Other modules 440 may also be present in the memory 420 as well as other data 442 in the data store 424. For example, an administrative module may provide a web interface to allow operators to modify operation of the multi-class classifier module 102, target-aware active training module 120, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a memory, storing first computer-executable instructions; and
a hardware processor to execute the first computer-executable instructions to:
perform a first iteration of training a multi-class classifier;
determine a first set of classes associated with the multi-class classifier;
determine a first input queue comprising a first plurality of instances of sample data;
determine, for each of the first set of classes, a weight value that is based on:
a current classification accuracy associated with the each of the first set of classes, and
a target classification accuracy associated with the each of the first set of classes;
determine a first set of priority weight data based on the weight values of the each of the first set of classes;
determine a first set of candidate label data based on the first input queue, wherein each instance of the first plurality of instances is associated with a respective set of candidate labels;
determine a first prioritized queue, wherein each of the first plurality of instances of sample data are ordered based on the respective set of candidate labels and the first set of priority weight data;
determine, based on the first prioritized queue, first annotated data comprising at least one of the first plurality of instances and an associated annotation label; and
increase the current classification accuracy associated with at least one of the first set of classes by performing a second iteration of training the multi-class classifier using the first annotated data.

2. The system of claim 1, the hardware processor to further execute the first computer-executable instructions to:

receive input data;

determine, using the multi-class classifier as trained using the first annotated data, a first class of the first set of classes that is associated with the input data; and store data indicative of the first class.

3. The system of claim 1, wherein the weight value for the each of the first set of classes is based on a difference between the current classification accuracy associated with the each of the first set of classes and the target classification accuracy associated with the each of the first set of classes.

4. A computer-implemented method comprising:

performing a first iteration of training a multi-class classifier;

determining a first queue comprising:

a first instance of sample data, and a second instance of sample data;

determining first weight data comprising:

a first weight associated with a first class, wherein the first weight is based on a first current classification accuracy associated with the first class and a first target classification accuracy associated with the first class; and a second weight associated with a second class, wherein the second weight is based on a second current classification accuracy associated with the second class and a second target classification accuracy associated with the second class;

determining a first set of candidate labels that are associated with the first instance;

determining a second set of candidate labels that are associated with the second instance;

determining, based on the first set of candidate labels and the first weight data, a first value;

determining, based on the second set of candidate labels and the first weight data, a second value;

determining a second queue based on the first queue, wherein an order of entries in the second queue is based on the first value and the second value; and increasing at least one of the first current classification accuracy associated with the first class or the second current classification accuracy associated with the second class by performing a second iteration of training the multi-class classifier based on the second queue.

5. The method of claim 4, wherein:

the first current classification accuracy is indicative of a first recall value and a first precision value;

the first target classification accuracy is indicative of a second recall value and a second precision value;

the second current classification accuracy is indicative of a third recall value and a third precision value; and the second target classification accuracy is indicative of a fourth recall value and a fourth precision value.

6. The method of claim 4, the determining the first set of candidate labels comprising:

determining a first candidate label;

determining a first probability value associated with the first candidate label;

determining a second candidate label;

determining a second probability value associated with the second candidate label;

determining that the first probability value is greater than or equal to a threshold value;

determining that the second probability value is less than the threshold value; and wherein the first set of candidate labels includes the first candidate label but does not include the second candidate label.

7. The method of claim 4, further comprising:

determining, using the multi-class classifier, a first candidate label and associated first classifier score;

determining, using the multi-class classifier, a second candidate label and associated second classifier score; and determining the first set of candidate labels based at least in part on first classifier score and the second classifier score each being greater than a threshold value.

8. The method of claim 4, the first queue further comprising a third instance of sample data; and the method further comprising:

determining a third set of candidate labels that are associated with the third instance;

determining, based on the third set of candidate labels and the first weight data, a third value; and wherein the second queue comprises the first instance and the second instance, but omits the third instance.

9. The method of claim 4, the first queue further comprising a third instance of sample data; and the method further comprising:

determining a third candidate label that is associated with the third instance;

determining that a current accuracy value associated with the third candidate label is greater than a threshold value; and wherein the second queue comprises the first instance and the second instance, but omits the third instance.

10. The method of claim 4, wherein the first set of candidate labels and the second set of candidate labels are determined using the multi-class classifier; and the method further comprising:

determining annotated data based on processing the second queue in the order; and wherein the performing the second iteration of the training the multi-class classifier is performed using the annotated data.

11. The computer-implemented method of claim 4, further comprising:

receiving input data;

determining, using the multi-class classifier after the performing the second iteration of training of the multi-class classifier, a class of the first class or the second class that is associated with the input data; and storing output indicative of the class.

12. A system comprising:

a memory, storing first computer-executable instructions; and a hardware processor to execute the first computer-executable instructions to:

determine a first instance of sample data;

determine a second instance of sample data;

determine a first current classification accuracy associated with a first class;

determine a first target classification accuracy associated with the first class;

determine a second current classification accuracy associated with a second class;

determine a second target classification accuracy associated with the second class;

determine first weight data comprising:

a first weight associated with the first class, wherein the first weight is determined based at least on the first current classification accuracy associated with the first class and the first target classification accuracy associated with the first class; and a second weight associated with the second class, wherein the second weight is determined based at least on the second current classification accuracy associated with the second class and the second target classification accuracy associated with the second class;

determine a first set of candidate labels that are associated with the first instance;

determine a second set of candidate labels that are associated with the second instance;

determine, based on the first set of candidate labels and the first weight data, a first value;

determine, based on the second set of candidate labels and the first weight data, a second value;

determine a first ordering of the first instance and the second instance based on the first value and the second value; and increase at least one of the first current classification accuracy associated with the first class or the second current classification accuracy associated with the second class by training a multi-class classifier based on the first ordering of the first instance and the second instance.

13. The system of claim 12, wherein:

the first current classification accuracy is indicative of a first recall value and a first precision value;

the first target classification accuracy is indicative of a second recall value and a second precision value;

the second current classification accuracy is indicative of a third recall value and a third precision value; and the second target classification accuracy is indicative of a fourth recall value and a fourth precision value.

14. The system of claim 12, the hardware processor to further execute the first computer-executable instructions to:

determine, using the multi-class classifier, a first candidate label and associated first classifier score;

determine, using the multi-class classifier, a second candidate label and associated second classifier score; and determine the first set of candidate labels based at least in part on the associated first classifier score and the associated second classifier score each being greater than a threshold value.

15. The system of claim 12, the hardware processor to further execute the first computer-executable instructions to:

determine, using the multi-class classifier, a first candidate label;

determine, using the multi-class classifier, a first probability value associated with the first candidate label;

determine, using the multi-class classifier, a second candidate label;

determine, using the multi-class classifier, a second probability value associated with the second candidate label;

determine that the first probability value is greater than or equal to a threshold value;

determine that the second probability value is less than the threshold value; and wherein the first set of candidate labels includes the first candidate label but does not include the second candidate label.

16. The system of claim 12, the hardware processor to further execute the first computer-executable instructions to:

determine, for each candidate label in the first set of candidate labels, a probability value indicative of a likelihood that the each candidate label in the first set of candidate labels is correct with respect to the first instance, and further wherein the each candidate label in the first set of candidate labels has a probability value greater than a first threshold; and determine, for each label in the second set of candidate labels, a probability value indicative of a likelihood that the each candidate label in the second set of candidate labels is correct with respect to the second instance, and further wherein the each candidate label in the second set of candidate labels has a probability value greater than the first threshold.

17. The system of claim 12, the hardware processor to further execute the first computer-executable instructions to:

determine a third instance of sample data;

determine a third set of candidate labels that are associated with the third instance;

determine, based on the third set of candidate labels and the first weight data, a third value; and wherein the first ordering omits the third instance.

18. The system of claim 12, the hardware processor to further execute the first computer-executable instructions to:

determine a third instance of sample data;

determine a third candidate label that is associated with the third instance;

determine that a current accuracy value associated with the third candidate label is greater than a threshold value; and wherein the first ordering omits the third instance.

19. The system of claim 12, the hardware processor to further execute the first computer-executable instructions to:

determine the first set of candidate labels using the multi-class classifier;

determine the second set of candidate labels using the multi-class classifier;

determine annotated data based on processing in the first ordering, the instances associated with the first ordering; and wherein the training the multi-class classifier uses the annotated data.

20. The system of claim 12, the hardware processor to further execute the first computer-executable instructions to:

receive input data;

determine, using the multi-class classifier after the training the multi-class classifier, a class of the first class or the second class that is associated with the input data; and store output indicative of the class.

* * * * *